United States Patent
Moon et al.

(10) Patent No.: US 7,505,380 B2
(45) Date of Patent: Mar. 17, 2009

(54) APPARATUS AND METHOD FOR PREVENTING WRITING ERROR FROM OCCURRING ON OPTICAL DISC

(75) Inventors: Jae-hee Moon, Suwon-si (KR); Seung-beom Lee, Goyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 576 days.

(21) Appl. No.: 10/742,934

(22) Filed: Dec. 23, 2003

(65) Prior Publication Data

US 2004/0151102 A1 Aug. 5, 2004

(30) Foreign Application Priority Data

Jan. 3, 2003 (KR) .................. 10-2003-0000379

(51) Int. Cl.
*G11B 7/00* (2006.01)
(52) U.S. Cl. .............. 369/47.11; 369/47.18; 369/47.48; 369/47.42; 369/53.34
(58) Field of Classification Search ........................ None
See application file for complete search history.

(56) References Cited

U.S. PATENT DOCUMENTS

| | | | |
|---|---|---|---|
| 6,496,458 B2 | 12/2002 | Tsukihashi | |
| 6,856,583 B2* | 2/2005 | Harada | 369/30.23 |
| 7,020,058 B2* | 3/2006 | Yamamoto | 369/47.38 |
| 7,151,732 B2* | 12/2006 | Tsuji | 369/53.31 |

FOREIGN PATENT DOCUMENTS

| | | |
|---|---|---|
| JP | 2000-163751 | 6/2000 |
| JP | 2001-266474 | 9/2001 |
| JP | 2002-170239 | 6/2002 |
| KR | 1999-54370 | 7/1999 |
| KR | 2002-222525 | 8/2002 |

\* cited by examiner

*Primary Examiner*—Joseph Feild
*Assistant Examiner*—Joseph Haley
(74) *Attorney, Agent, or Firm*—Staas & Halsey LLP

(57) ABSTRACT

An apparatus for preventing a writing error from occurring on an optical disc. The apparatus includes an interpolation ATIP sync signal detector, a number determiner, and a writing speed adjuster. The interpolation ATIP sync signal detector receives a wobble signal from the wobble signal generator of an optical disc drive to detect an interpolation ATIP sync signal from the wobble signal. The number determiner determines a number of interpolation ATIP sync signals and generates a writing speed transformation control signal based on the determination result. The writing speed adjuster receives the writing speed transformation control signal from the number determiner to adjust a writing speed of the optical disc drive.

12 Claims, 3 Drawing Sheets

APPARATUS AND METHOD FOR PREVENTING WRITING ERROR FROM OCCURRING ON OPTICAL DISC

CROSS-REFERENCE TO RELATED APPLICATIONS

This application claims the benefit of Korean Patent Application No. 2003-379, filed on Jan. 3, 2003, in the Korean Intellectual Property Office, the disclosure of which is incorporated herein by reference.

BACKGROUND OF THE INVENTION

1. Field of the Invention

The present invention relates to an apparatus and method for preventing a writing error occurring on an optical disc, and more particularly, to an apparatus and method for preventing a failure in writing data to an optical disc at a high speed.

2. Description of the Related Art

With the appearance of the digital age, compact discs (CDs), digital versatile discs (DVDs), and the like have been used as information recording and/or reproducing media.

In order to optimally and rapidly process and/or represent various types of data, competitive attempts to increase speeds of writing data to and reading data from an optical disc have been made.

However, the increase in the writing and reading speeds causes errors to occur when writing and reading data. As the writing and reading speeds increase, errors may occur. In particular, the probability of the occurrence of errors during writing is much higher than the probability of the occurrence of errors during reading.

Among those errors, a write failure takes place due to several factors, such as radial noise of an optical disc, etc. For example, when a 24× optical disc and a 48× optical disc have the same identification (ID), an optical disc drive recognizes the 24× and 48× optical discs as optical discs of the same speed. Thus, although writing is successfully achieved on the 24× (or 48×) optical disc using a 48× (or 24×) optical disc drive, writing quality may be poor. That is, since an optical disc drive recognizes optical discs having different writing characteristics as the same type of optical disc due to the same ID and then performs writing on them, errors may occur.

In a case where problems arise during packaging of discs, writing errors may occur due to focus drop and/or untracking, variations in the characteristics of an optical pickup and external factors.

There are several conventional techniques for preventing writing failures.

A first conventional technique is disclosed in Japanese Patent Publication No. 2000-163751. In the first conventional technique, information on an Absolute Time In Pre-groove (ATIP) signal is read from an optical disc to determine a writing speed of the optical disc. Next, writing is performed in a test area of the optical disc at optimal power control (OPC) corresponding to the determined writing speed and an optimal writing speed is extracted from the writing characteristics of the test area to write data in a program area. Thus, in the first conventional technique, since writing is performed in the test area and then in the program area, writing quality can be secured. However, the writing time increases due to writing delays.

A second conventional technique is described in Japanese Patent Publication No. 2001-266474 in which a number of rotations of an optical disc is controlled based on an ATIP signal detected from a wobble signal. A counterclockwise rotation of the optical disc shifts to the clockwise rotation using the ATIP signal. Next, a clockwise rotation controller calculates a difference between the counterclockwise rotation and the clockwise rotation, and a bit operation is performed on a target coefficient. The difference value is compared with the bit operation result. Thereafter, the ratio of the difference value to the target coefficient is determined to generate a signal to indicate the time when the counterclockwise rotation shifts to the clockwise rotation. Also, a shift control signal is applied to a rotation control shifter to shift the counterclockwise rotation to the clockwise rotation. As a result, a writing error may be prevented. However, the second conventional technique has the following disadvantages. The conditions such as the target coefficient must be preset to prevent the writing error and when the ATIP signal has an error, writing errors may not be prevented.

Japanese Patent Publication No. 2002-170239 discloses a third conventional technique for preventing a failure in writing data in a program area of a poor quality disc. A cycle redundancy check (CRC) flag is calculated from ATIP data included in a wobble signal to determine whether the ATIP data is correct. When an error occurs during the calculation of the CRC flag and a sync signal ATIPSYNC of the ATIP data is out of phase with a sync signal SUBSYNC of written data during writing at OPC, a writing speed is reduced and then writing is performed in a test area a second time. Thereafter, data is read from the test area to calculate OPC and writing is performed in the program area using the OPC. In the third conventional technique, since writing is performed in the test area and then in the program area, writing quality can be secured. However, the writing time increases due to writing delays.

SUMMARY OF THE INVENTION

Accordingly, it is an aspect of the present invention to provide an apparatus and method for preventing a writing error from occurring on an optical disc due to an increase in a writing speed.

Additional aspects and/or advantages of the invention will be set forth in part in the description which follows and, in part, will be obvious from the description, or may be learned by practice of the invention.

The foregoing and/or other aspects of the present invention are achieved by, providing an apparatus for preventing a writing error from occurring on an optical disc. The apparatus comprises an interpolation ATIP sync signal detector, a number determiner, and a writing speed adjuster. The interpolation ATIP sync signal detector receives a wobble signal from a wobble signal generator of an optical disc drive and detects an interpolation ATIP sync signal from the wobble signal. The number determiner determines a number of interpolation ATIP sync signals and generates a writing speed transformation control signal based on the number of interpolation ATIP sync signals determined. The writing speed adjuster receives the writing speed transformation control signal from the number determiner to adjust a writing speed of the optical disc drive.

It is another aspect of the present invention, to provide a method of preventing a writing error from occurring on an optical disc. The method comprises receiving a wobble signal from a wobble signal generator of an optical disc drive and detecting an interpolation ATIP sync signal from the wobble signal, determining a number of interpolation ATIP sync signals and generating a writing speed transformation control signal is based on the number of interpolation ATIP sync signals determined. Thus, adjusting writing speed of the optical disc drive iaccording to the writing speed transformation control signal.

BRIEF DESCRIPTION OF THE DRAWINGS

These and/or other aspects and advantages of the invention will become apparent and more readily appreciated from the following descriptions of the embodiments taken in conjunction with the accompanying drawings in which.

DETAILED DESCRIPTION OF THE PREFERRED EMBODIMENTS

Figure 1:
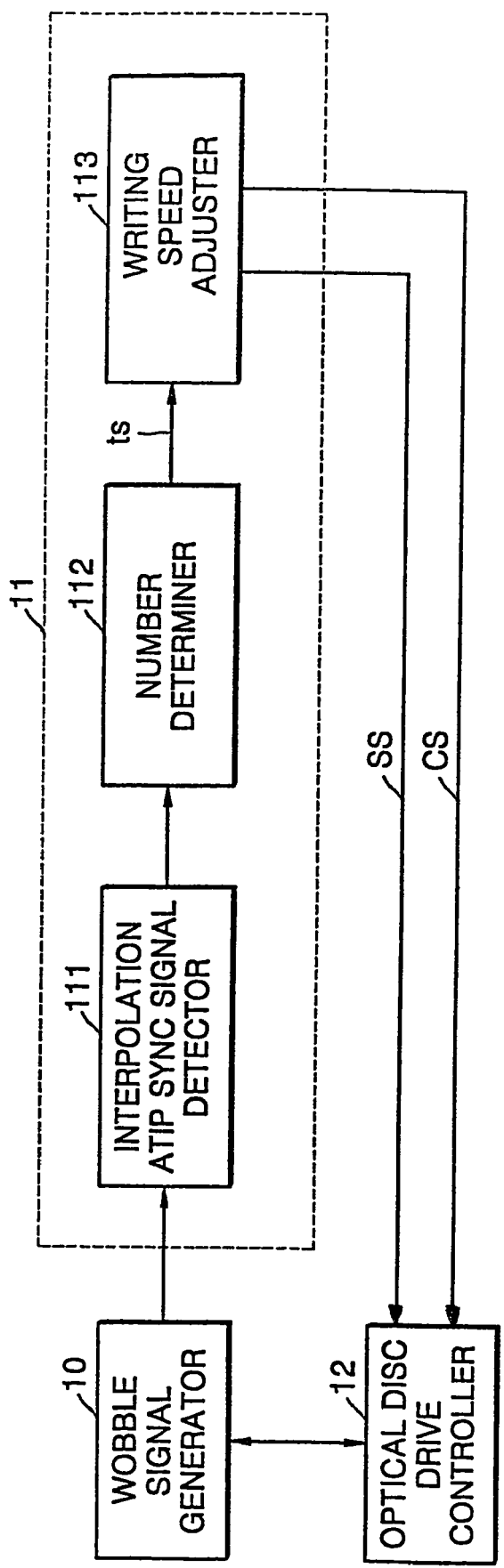
FIG. 1 is a view of an apparatus for preventing a writing error, according to an embodiment of the present invention.

Reference will now be made in detail to the embodiments of the present invention, examples of which are illustrated in the accompanying drawings, wherein like reference numerals refer to like elements throughout. The embodiments are described below to explain the present invention by referring to the figures.

FIG. 1 is a view of an apparatus 11 for preventing a writing error, according to an embodiment of the present invention. Referring to FIG. 1, a wobble signal generator 10 is controlled by an optical disc drive controller 12 and generates a wobble signal to indicate the time when data is written to an optical disc. The wobble signal comprises a sync control signal and a speed control signal.

The sync control signal comprises a tracking signal, a focusing signal and an ATIP sync signal. The ATIP signal is closely related with the present invention and greatly affects the time for writing data, particularly, success and failure in writing and quality of writing.

The speed control signal controls a rotational speed of a motor which rotates the optical disc. The speed control signal and the sync control signal affect the operation of a servo which controls driving of the motor.

An interpolation ATIP sync signal detector 111 receives the wobble signal from the wobble signal generator 10 and detects an interpolation ATIP sync signal from the wobble signal. Here, the interpolation ATIP sync signal refers to an ATIP sync signal which is artificially interpolated by the wobble signal generator 10 when the wobble signal generator 10 does not normally generate an ATIP sync signal due to the characteristics of the optical disc, variations in the characteristics of an optical pickup and external factors, thus resulting in writing errors.

When the interpolation ATIP sync signal is indefinitely applied, writing to the optical disc may continue. However, the ATIP sync signal may be distorted, and an error may occur when reading written data. Accordingly, the interpolation ATIP sync signal must be applied within a definite period of time, i.e., a number of interpolation ATIP sync signals must be limited. Thus, when the interpolation ATIP signal is not detected, writing to the optical disc continues.

A number determiner 112 determines whether a predetermined number of interpolation ATIP sync signals are consecutively detected within a predetermined period of time. The predetermined number is not an absolute value but varies depending on characteristics of the optical disc drive and the optical disc. In the present embodiment, the predetermined number is set to 3.

When the number determiner 112 determines that three or more interpolation ATIP sync signals are consecutively detected within the predetermined period of time, the number determiner 112 generates a control signal ts, i.e., a writing speed transformation control signal to transform a writing speed. When the number determiner 112 determines that less than three interpolation ATIP sync signals are consecutively detected within the predetermined period of time, writing to the optical disc continues. The predetermined period of time refers to a period for which a normal ATIP sync signal is active.

A writing speed adjuster 113 receives the writing speed transformation control signal ts from the number determiner 112 to adjust a writing speed of the optical disc drive to a speed of an optical disc on which writing is to be performed. Thus, when three or more interpolation ATIP sync signals are consecutively detected, the writing speed adjuster 113 applies a control signal ss, i.e., a writing stop control signal to stop writing to the optical disc drive controller 12 so that the optical disc drive enters a pause mode.

According to an aspect of the present invention, the pause mode is a Justlink Pause mode. However, other types of pause modes including a Superlink Pause mode, an Exectlink Pause mode, and the like may be adopted.

After the optical disc drive enters the pause mode, the writing speed adjuster 113 adjusts the writing speed of the optical disc drive to the speed of the optical disc and then applies a control signal cs, i.e., a writing speed adjustment control signal to adjust the writing speed to the optical disc drive controller 12. The optical disc drive controller 12 then generates information on the writing speed and transmits the information to the wobble signal generator 10.

The wobble signal generator 10 transforms the original sync control signal and the original speed control signal into an ATIP sync signal and a speed control signal based on the adjusted writing speed. Next, the wobble signal generator 10 applies the new ATIP sync signal and the new speed control signal based on the adjusted writing speed, to the servo.

The servo is controlled by the ATIP sync signal and the speed control signal based on the adjusted writing speed, to rotate the optical disc. The optical disc drive controller 12 determines whether an ATIP sync signal corresponding to the adjusted writing speed is extracted correctly. When the ATIP sync signal is extracted correctly, writing restarts at the adjusted writing speed.

The writing speed may be adjusted from a high speed to a low speed or from the low speed to the high speed. However, since a writing error is more likely to occur when high-speed writing is performed on a low speed optical disc, the writing speed is mainly adjusted from the high speed to the low speed.

Figure 2A:
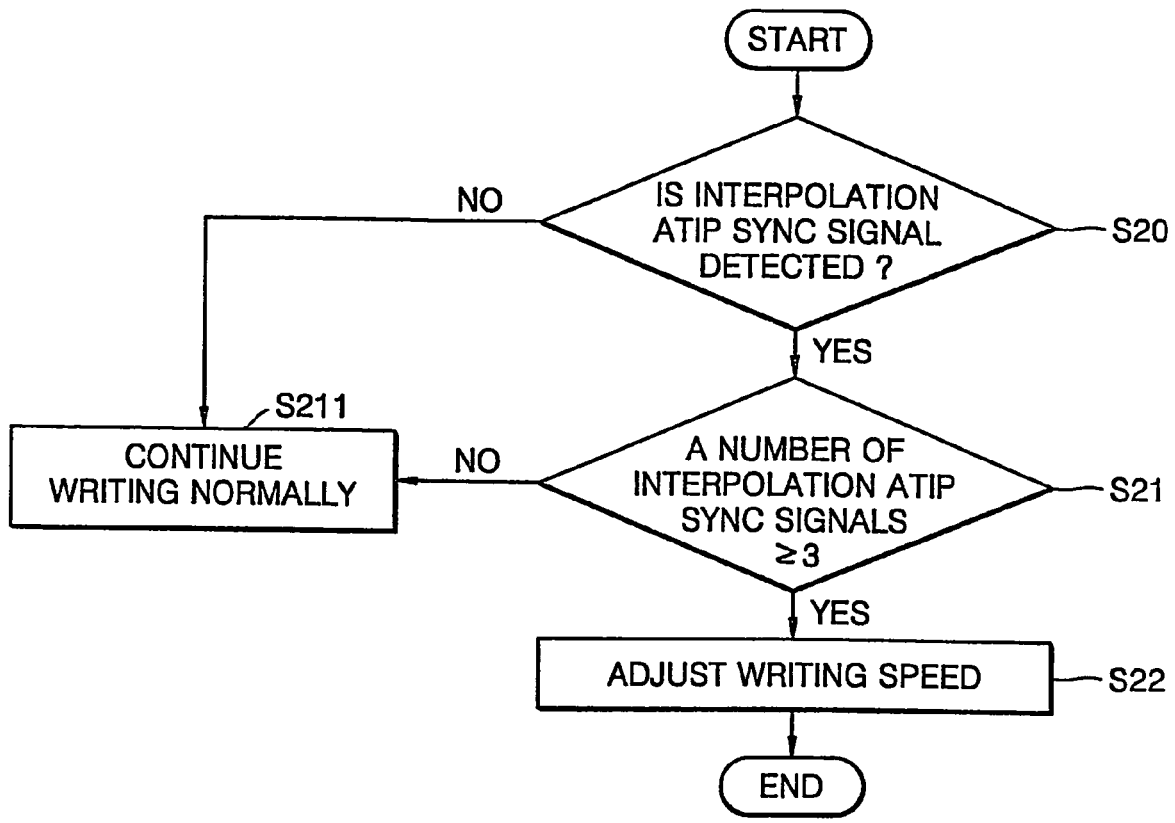
FIG. 2A is a flowchart illustrating a method of preventing a writing error, according to an embodiment of the present invention.
Figure 2B:
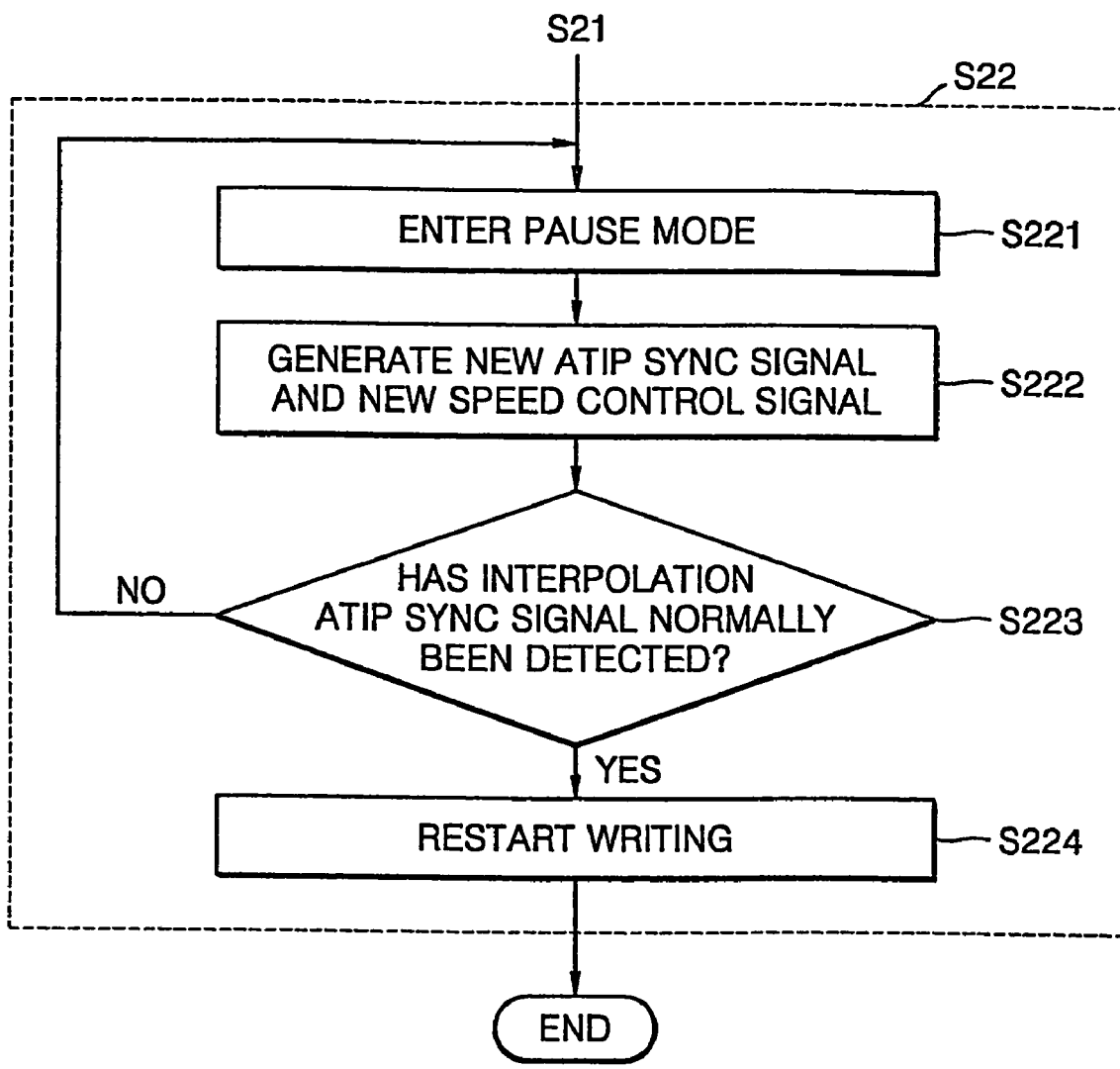
FIG. 2B is a flowchart of operation S22 of FIG. 2A.

FIG. 2A is a flowchart illustrating a method of preventing a writing error, according to an embodiment of the present invention, and FIG. 2B is a flowchart of operation S22 of FIG. 2A. Referring to FIGS. 2A and 2B, in operation S20, the wobble signal is received from the wobble signal generator 10 of the optical disc drive and an interpolation ATIP sync signal is detected from the wobble signal. Thus, the interpolation ATIP sync signal refers to an ATIP sync signal which is artificially interpolated by the wobble signal generator 10 when the wobble signal generator 10 does not correctly generate an ATIP sync signal due to the characteristics of the optical disc, variations in the characteristics of an optical pickup, and external factors, thus resulting in writing errors.

When the interpolation ATIP sync signal is indefinitely applied, writing to the optical disc may continue. However, the ATIP sync signal may be distorted, and thus an error may occur when reading written data. Accordingly, the interpolation ATIP sync signal must be applied within a definite period of time, i.e., a number of interpolation ATIP interpolation signals must be limited.

When the interpolation ATIP sync signal is not detected, writing continues normally in operation S211.

In operation S21, a determination is made as to whether a predetermined number of interpolation ATIP sync signals are consecutively input within a predetermined period of time. The predetermined number is not an absolute value but varies depending on the characteristics of the optical disc drive and the optical disc. In the present embodiment, the predetermined number is set to 3.

In operation S21, when it is determined that three or more interpolation ATIP sync signals are consecutively detected within the predetermined period of time, then in operation S22, the writing speed transformation control signal ts is generated to adjust a writing speed. In operation S21, when it is determined that less than three interpolation ATIP sync signals are consecutively detected, the process moves to operation S211 to continue writing to the optical disc. The predetermined period of time refers to a period for which a normal ATIP sync signal is active.

In operation S22, the writing speed of the optical disc drive is adjusted to the writing speed of the optical disc on which writing is to be performed, according to the writing speed transformation control signal ts. In FIG. 2B, operation S22 comprises operations S221, S222, S223, and S224. In operation S221, the optical disc drive enters the pause mode. In operation S222, a new ATIP sync signal and a new speed control signal are generated according to the adjusted writing speed. In operation S223, a determination is made as to whether the ATIP sync signal corresponding to the adjusted writing speed is extracted correctly. In operation S224, writing restarts.

When three or more interpolation ATIP sync signals are consecutively detected, in operation S21, the optical disc drive enters the pause mode in operation S221.

The pause mode is a Justlink Pause mode. However, other types of pause modes including a Superlink Pause mode, an Exectlink Pause mode, and the like may be adopted.

In operation S222, the wobble signal generator 10 of the optical disc drive transforms the original sync control signal and the original speed control signal into an ATIP sync signal and a speed control signal based on the adjusted writing speed. Next, the wobble signal generator 10 applies the ATIP sync signal and the speed control signal based on the adjusted writing speed to the servo.

In operation S223, a determination is made as to whether the ATIP sync signal corresponding to the adjusted writing speed is extracted correctly. In operation S223, when it is determined that the ATIP sync signal corresponding to the adjusted writing speed is extracted correctly, writing restarts in operation S224.

The writing speed may be adjusted from the high speed to the low speed or from the low speed to the high speed. However, since the writing error is more likely to occur when high-speed writing is performed on the low speed optical disc, the writing speed is mainly adjusted from the high speed to the low speed.

In the above-described conventional techniques, a writing speed is determined depending on the specifications of an optical disc drive, i.e., the writing speed is limitedly preset. Thus, the writing speed cannot be flexibly adjusted. In addition, writing is performed in a test area of an optical disc and then a writing speed is determined based on the reproduction characteristics of the test area to perform writing in a program area. Thus, writing quality can be secured. However, a writing time is delayed.

However, as described above, in an apparatus and method for preventing a writing error according to the present invention, the conditions to adjust a writing speed do not need to be preset. The writing speed can be flexibly adjusted by monitoring several control signals in real time. Thus, the apparatus of the present invention may be realized as a module separate from an optical disc drive. As a result, the apparatus of the present invention can be installed either outside or inside the optical disc drive. Therefore, the optical disc drive does not require an additional operation to set the writing speed.

Moreover, the apparatus of the present invention may prevent a writing error from occurring in any type of optical disc drive.

Furthermore, since writing is performed based on the characteristics of the optical disc, writing and reading qualities of data can be considerably improved.

The present invention may be realized as a computer-readable code on a computer-readable transmission medium. Computer-readable transmission medium include all kinds of recording apparatuses on which computer-readable data is stored. Examples of the computer-readable transmission medium are ROMs, RAMs, CD-ROMs, magnetic tapes, floppy discs, optical data storage devices, carrier wave media, etc., on which data can be stored and distributed. The computer-readable transmission medium may be a computer-readable storage medium, such as ROMs, RAMs, CD-ROMs, magnetic tapes, floppy discs, optical data storage devices or any other type of physical storage medium. The operations can also be distributed via downloading over a network such as the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for preventing a writing error from occurring on an optical disc in an optical disc drive having a wobble signal generator, the apparatus comprising:
    an interpolation ATIP sync signal detector which receives a wobble signal from the wobble signal generator of the optical disc drive and detects an interpolation ATIP sync signal from the wobble signal, the interpolation ATIP sync signal being an ATIP sync signal which is artificially interpolated by the wobble signal generator when the wobble signal generator does not normally generate an ATIP sync signal;
    a number determiner which determines a number of interpolation ATIP sync signals and generates a writing speed transformation control signal based on the number of interpolation ATIP sync signals determined; and
    a writing speed adjuster which receives the writing speed transformation control signal from the number determiner and adjusts a writing speed of the optical disc drive to a speed of the optical disc on which writing is to be performed.

2. The apparatus of claim 1, wherein the number determiner determines whether a predetermined number of interpolation ATIP sync signals are consecutively detected within a predetermined period of time.

3. The apparatus of claim 1, wherein upon determining that the predetermined number of interpolation ATIP sync signals are consecutively detected within the predetermined period of time, the writing speed adjuster applies a writing stop control signal to an optical disc drive controller so that the optical disc drive enters a pause mode, adjusts the writing speed to a speed of the optical disc, and applies a writing speed adjustment control signal to the optical disc drive to adjust the writing speed.

4. The apparatus of claim 1, wherein the writing speed adjuster adjusts the writing speed by monitoring a plurality of control signals in real time.

5. A method of preventing a writing error on an optical disc, comprising:
   receiving a wobble signal from a wobble signal generator of an optical disc drive and detecting an interpolation ATIP sync signal from the wobble signal, the interpolation ATIP sync signal being an ATIP sync signal which is artificially interpolated by the wobble signal generator when the wobble signal generator does not normally generate an ATIP sync signal;
   determining a number of interpolation ATIP sync signals and generating a writing speed transformation control signal based on the determining of the number of interpolation ATIP sync signals; and
   adjusting a writing speed of the optical disc drive according to the writing speed transformation control signal, to a speed of the optical disc on which writing is to be performed.

6. The method of claim 5, wherein the determining of the number of interpolation ATIP sync signals and the generating of the writing speed transformation control signal comprises determining whether a predetermined number or more of interpolation ATIP sync signals are consecutively detected within a predetermined period of time.

7. The method of claim 5, wherein the adjusting the writing speed of the optical disc drive according to the writing speed transformation control signal comprises:
   upon determining that the predetermined number of interpolation ATIP sync signals are consecutively detected within the predetermined period of time, allowing the optical disc drive to enter a pause mode;
   generating an ATIP sync signal based on the adjusted writing speed;
   determining whether the ATIP sync signal based on the adjusted writing speed has been generated; and
   restarting writing at the adjusted writing speed.

8. The method of claim 5, wherein adjusting a writing speed is performed by monitoring a plurality of control signals in real time.

9. A computer readable storage medium encoded with processing instructions for implementing a method of preventing a writing error on an optical disc, the method comprising:
   receiving a wobble signal from a wobble signal generator of an optical disc drive and detecting an interpolation ATIP sync signal from the wobble signal, the interpolation ATIP sync signal being an ATIP sync signal which is artificially interpolated by the wobble signal generator when the wobble signal generator does not normally generate an ATIP sync signal;
   determining a number of interpolation ATIP sync signals and generating a writing speed transformation control signal based on the determining of the number of interpolation ATIP sync signals; and
   adjusting a writing speed of the optical disc drive according to the writing speed transformation control signal, to a speed of the optical disc on which writing is to be performed.

10. The computer readable storage medium of claim 9, wherein in the determining of the number of interpolation ATIP sync signals and the generating of the writing speed transformation control signal comprises determining whether a predetermined number of interpolation ATIP sync signals are consecutively detected within a predetermined period of time.

11. The computer readable storage medium of claim 9, wherein the adjusting the writing speed of the optical disc drive according to the writing speed transformation control signal comprises:
    upon determining that the predetermined number of interpolation ATIP sync signals are consecutively detected within the predetermined period of time, allowing the optical disc drive to enter a pause mode;
    generating an ATIP sync signal based on the adjusted writing speed;
    determining whether the ATIP sync signal based on the adjusted writing speed has been generated correctly; and
    restarting the writing at the adjusted writing speed.

12. The computer readable storage medium of claim 9, wherein the adjusting of the writing speed comprises monitoring a plurality of control signals in real time.

* * * * *

UNITED STATES PATENT AND TRADEMARK OFFICE
CERTIFICATE OF CORRECTION

PATENT NO. : 7,505,380 B2  Page 1 of 1
APPLICATION NO. : 10/742934
DATED : March 17, 2009
INVENTOR(S) : Jae-Hee Moon et al.

It is certified that error appears in the above-identified patent and that said Letters Patent is hereby corrected as shown below:

On the Title Page, Item (57) (Abstract), Line 5, change "the" to --a--.

Signed and Sealed this

Sixteenth Day of June, 2009

JOHN DOLL
*Acting Director of the United States Patent and Trademark Office*